(12) United States Patent
Kageyama

(10) Patent No.: US 8,578,985 B2
(45) Date of Patent: Nov. 12, 2013

(54) PNEUMATIC TIRE WITH SIPES

(75) Inventor: Naoki Kageyama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 709 days.

(21) Appl. No.: 12/612,721

(22) Filed: Nov. 5, 2009

(65) Prior Publication Data

US 2010/0154952 A1 Jun. 24, 2010

(30) Foreign Application Priority Data

Dec. 22, 2008 (JP) ................. 2008-325970

(51) Int. Cl.
 *B60C 11/11* (2006.01)
 *B60C 11/12* (2006.01)

(52) U.S. Cl.
 USPC ............. 152/209.8; 152/209.18; 152/DIG. 3

(58) Field of Classification Search
 USPC .............. 152/209.8, 209.18, 902, DIG. 3
 See application file for complete search history.

(56) References Cited

U.S. PATENT DOCUMENTS

| 2007/0199634 A1* | 8/2007 | Sakamaki ................. 152/DIG. 3 |
| 2008/0156405 A1* | 7/2008 | Tanabe ...................... 152/209.18 |

FOREIGN PATENT DOCUMENTS

| DE | 3540668 A1 * | 5/1987 |
| EP | 1529659 A2 | 5/2005 |
| EP | 1787826 A1 | 5/2007 |
| EP | 1795372 A2 | 6/2007 |
| JP | 62-265006 A * | 11/1987 |
| JP | 63-305009 A * | 12/1988 |
| JP | 4-159108 A | 6/1992 |
| JP | 06-239110 A * | 8/1994 |
| JP | 11-310013 A * | 11/1999 |
| JP | 2973024 B2 * | 11/1999 |
| JP | 2000-094909 A * | 4/2000 |
| JP | 2005-41393 A | 2/2005 |

OTHER PUBLICATIONS

Machine translation for German 3,540,668 (no date).*
Machine translation for Japan 2000-094909 (no date).*
Machine translation for Japan 11-310013 (no date).*
Machine translation for Japan 06-239110 (no date).*
Machine translation for Japan 2,973,024 (no date).*

* cited by examiner

Primary Examiner — Steven D Maki
(74) Attorney, Agent, or Firm — Birch, Stewart, Kolasch & Birch, LLP

(57) ABSTRACT

A pneumatic tire whose steering stability on dry roads is improved with minimizing lowering of on-snow performances and which has round shoulders and comprises tread portion 2 divided by circumferential main grooves 3 and lateral grooves 4 into blocks 5 provided with sipes 6 each having zigzag part 8, the circumferential grooves 3 including at least a pair of axially outermost circumferential grooves 3$o$ to divide the tread portion 2 into shoulder regions Ysh and crown region Ycr, wherein the zigzag part 8 of sipes 6$sh$ disposed in the shoulder regions Ysh has a larger zigzag amplitude Wsh and a larger zigzag pitch Psh than zigzag amplitude Wcr and zigzag pitch Pcr of the zigzag part 8 of sipes 6$cr$ disposed in the crown region Ycr, and angle θsh of the sipes 6$sh$ with respect to the axial direction is smaller than angle θcr of the sipes 6$cr$ with respect to the axial direction.

10 Claims, 6 Drawing Sheets

PNEUMATIC TIRE WITH SIPES

BACKGROUND OF THE INVENTION

The present invention relates to a pneumatic tire suitable as a studless tire, and more particularly to a pneumatic tire having a good steering stability on dry roads improved while keeping lowering of performances on snow-covered roads to the minimum.

Pneumatic tires suitable for traveling on icy and snow-covered roads, including for example studless tires, usually have in the tread surface a plurality of circumferential grooves extending in a circumferential direction of a tire and a plurality of lateral grooves extending in a direction intersecting with the circumferential grooves to form a plurality of blocks in which a plurality of zigzag sipes are further provided, as known for example from JP-A-11-310013 and JP-A-2005-041393. The performances on snow-covered roads (hereinafter referred to as "on-snow performances") are secured by a shearing force of snow columns formed in the grooves and an edge effect obtained by edges of the blocks and the sipes.

It is known that it is preferred for the on-snow performances to increase the volume of grooves, thereby enhancing the shearing force of snow columns, and to increase the number of sipes to be formed, thereby enhancing the edge effect.

However, increase of the groove volume and increase of the number of sipes lead to lowering of the block rigidity, thus resulting in deterioration of steering stability on dry roads (hereinafter referred to as "dry steering stability"). The on-the-snow performances and the dry steering stability are performances repugnant to each other and, therefore, it is difficult to simultaneously maintain both performances on high levels.

Accordingly, it is an object of the present invention to provide a pneumatic tire which is suitable for traveling on icy and snow-covered roads and, moreover, the dry steering stability of which is improved with keeping lowering of the on-snow performances to the minimum.

This and other objects of the present invention will become apparent from the description hereinafter.

SUMMARY OF THE INVENTION

The present inventor studied about studless tire, particularly amplitude and pitch of a zigzag shape of sipes. Thus, it has been found that (1) if the amplitude and pitch of a zigzag are large, engagement of opposite zigzag walls of a sipe is firm, so the block rigidity is relatively enhanced, and if the amplitude and pitch of a zigzag are small, the block rigidity is relaxed, and (2) as shown in FIG. 7, if a tread portion "a" of a tire is divided by a pair of axially outermost circumferential main grooves "b" into shoulder regions "a1" and a crown region "a2", the crown region "a2" having a large ground contact area has a larger influence on traveling on snow-covered roads, and the shoulder regions "a1" on which a lateral force acts strongly during cornering have a larger influence on cornering performance on dry roads. In FIG. 7, symbol "f1" denotes a ground contact region of the tire when traveling straightly on a snow-covered road, and symbol "f2" denotes a ground contact region of the tire when cornering on a dry road. It has been further found that resistance to a lateral force acting at the time of cornering and lane change can be effectively enhanced with allowing the snow-biting performance and the snow-expelling performance to effectively function to improve the steering stability on dry roads while minimizing lowering of the on-snow performances by disposing zigzag sipes having a small amplitude and a small pitch in the crown region "a2" having a larger influence on snow road traveling and disposing zigzag sipes having a large amplitude and a large pitch in the shoulder regions "a1" having a larger influence on cornering performances on dry roads. Thus, the present invention is characterized by dissimilating the amplitude of a zigzag in a sipe, the pitch of the zigzag, and an angle of arrangement of sipes between the shoulder region and the crown region.

In accordance with the present invention, there is provided a pneumatic tire comprising a tread portion having a plurality of circumferential main grooves extending continuously in a circumferential direction of the tire and including a pair of axially outermost circumferential grooves, a plurality of lateral grooves extending in a direction intersecting the circumferential main grooves to divide the tread portion into a plurality of blocks, and sipes provided in the blocks, the tread portion having shoulder portions each including a tread ground contact edge and having a round shoulder shape such that the profile line in the meridian section of the tire comprises a circular arc curve having a radius of curvature of at least 25 mm, the pair of axially outermost circumferential grooves dividing the tread portion into shoulder regions located axially outward of the outermost circumferential grooves and a crown region located between the outermost circumferential grooves, the sipes each having a zigzag part extending in a length direction of the sipe in the form of a zigzag, the sipes comprising sipes disposed in the shoulder regions and sipes disposed in the crown region, wherein the zigzag part of each of the sipes disposed in the shoulder regions has a larger amplitude Wsh and a larger pitch Psh than amplitude Wcr and pitch Pcr of the zigzag part of each of the sipes disposed in the crown region, and the sipes disposed in the shoulder regions are inclined at an angle $\theta sh$ with respect to an axial direction of the tire which is smaller than an angle $\theta cr$ with respect to the axial direction of the sipes disposed in the crown region.

Preferably, a ratio Wsh/Wcr is from 1.2 to 2.0 and a ratio Psh/Pcr is from 1.2 to 3.0. Preferably, the angle $\theta sh$ is 30° or less, and the angle $\theta cr$ is from 15 to 60°.

The circumferential main grooves may further include at least one inner circumferential groove disposed in the crown region. In a preferable embodiment, the circumferential main grooves include two inner circumferential grooves disposed in the crown region to divide the crown region into an inner crown region located between the inner circumferential grooves and outer crown regions located between each of the inner circumferential grooves and each of the outermost circumferential grooves, and an inclination direction of the sipes disposed in the inner crown region is opposite to that of the sipes disposed in the outer crown regions with respect to the axial direction of the tire.

The sipes having a small amplitude and a small pitch of a zigzag serve to ease the block rigidity and, therefore, blocks can deform at the time of grounding to enhance the snow-biting performance and the snow-expelling performance. Since such deformable blocks are provided in the crown region having a large influence on traveling on snow-covered roads, the pneumatic tire of the present invention effectively exhibit the snow-biting performance and the snow-expelling performance to effectively improve the on-snow performances. On the other hand, since the sipes disposed in the shoulder regions have a larger amplitude and a larger pitch of a zigzag, the block rigidity in the shoulder regions is enhanced to exhibit a high resistance to a lateral force acting during cornering or lane change, so the steering stability on dry roads is improved while improving the on-snow performances based on the sipes having small amplitude and pitch in the crown region.

The term "tread ground contact edges" or "ground contact edges" as used herein means axially outermost edges of a tread ground contact surface of a tire that is brought into contact with a ground (flat surface) at a camber angle of 0° under the condition that the tire is mounted on a normal rim, inflated to a normal inner pressure and such a tire in the normal inner pressure condition is then loaded with a normal load. The term "normal rim" as used herein means a rim defined for every tire in a standardizing system on which the tire is based and, for example, denotes "standard rim" in JATMA, "Design Rim" in TRA and "Measuring Rim" in ETRTO. Also, the term "normal inner pressure" as used herein means an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa. Further, the term "normal load" means a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO.

DETAILED DESCRIPTION OF THE INVENTION

An embodiment of the present invention will now be explained with reference to the accompanying drawings.

Figure 1:
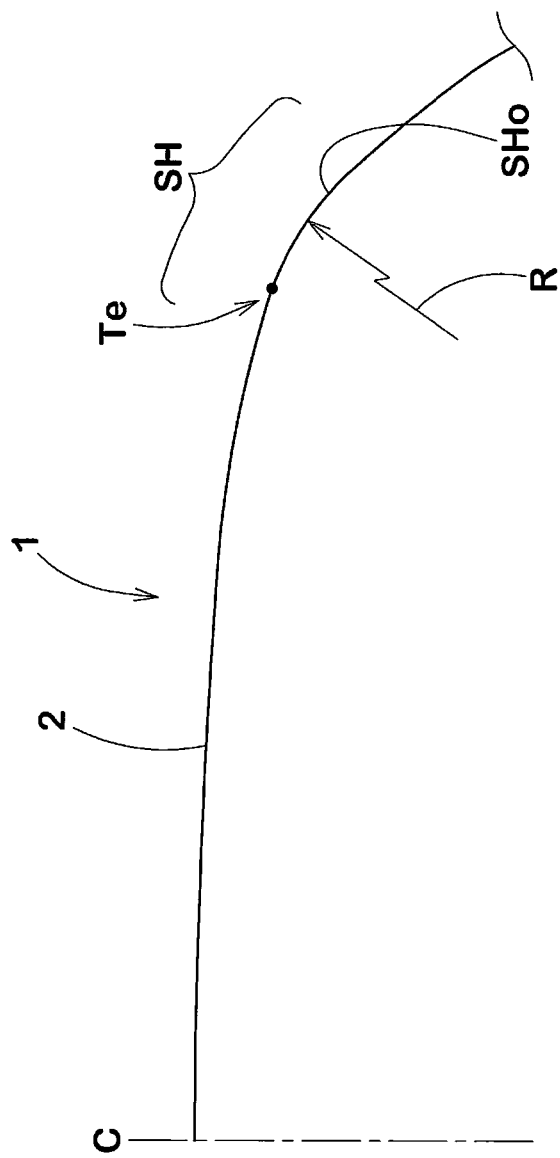
FIG. 1 is a view showing a profile line of a tread portion of a pneumatic tire according to the present invention in a tire meridian cross section.

FIG. 1 shows a profile line of a tread portion 2 of a pneumatic tire 1 according to the present invention in a tire meridian cross section. As shown in FIG. 1, the pneumatic tire 1 in this embodiment has a round shoulder shape that the profile line of a tire shoulder SH including a tread ground contact edge Te comprises a circular arc curve having a radius of curvature of 25 mm or more. In case of the tire having such a round shoulder shape, a region Sho located axially outward of a ground contact edge Te which is an outer edge with respect to the center of cornering, can come into contact with a ground when a lateral force acts on the tire during cornering. Therefore, the ground contact area can be increased as compared with tires having a square shoulder shape or a tapered shoulder shape, whereby a high cornering force can be secured. Having the round shoulder shape is important in exhibiting the effects of the present invention. In FIG. 1, symbol "C" denotes a tire equator.

Figure 2:
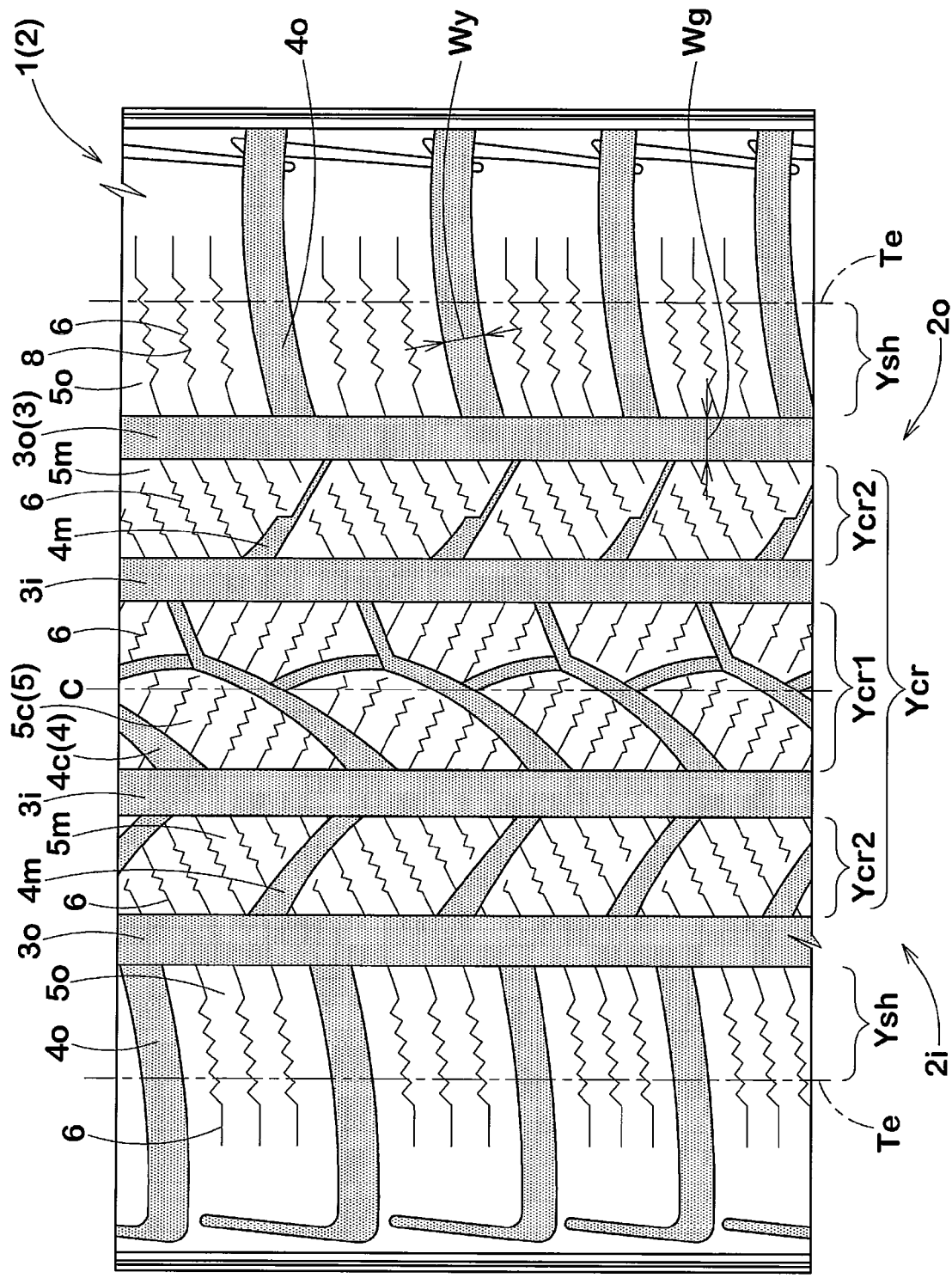
FIG. 2 is a development view showing a tread patter of a pneumatic tire according to the present invention.

FIG. 2 shows an example of a tread pattern suitable for a pneumatic tire 1 of the present invention when it is used as a studless tire for passenger cars. The pneumatic tire 1 has, in the tread portion 2, a plurality of circumferential main grooves 3 (3$i$, 3$o$) extending continuously in the circumferential direction of tire, and a plurality of lateral grooves 4 (4$o$, 4$m$, 4$c$) extending in a direction intersecting the circumferential main grooves 3, whereby the tread portion 2 is divided into a plurality of blocks 5 (5$o$, 5$m$, 5$c$) to form a block pattern.

The circumferential main grooves 3 include at least a pair of axially outermost circumferential grooves 3$o$ to divide the tread portion 2 into shoulder regions Ysh located axially outward of the outermost circumferential grooves 3$o$ and a crown region Ycr located between the outermost circumferential grooves 3$o$, 3$o$.

The circumferential main grooves 3 may further include one or more inner circumferential grooves disposed in the crown region Ycr. In the embodiment shown in FIG. 2, the circumferential main grooves 3 include four circumferential grooves comprising a pair of inner circumferential grooves 3$i$ which extend on the both sides of the tire equator C and a pair of the outermost circumferential grooves 3$o$ disposed axially outward of the inner circumferential grooves 3$i$. The inner circumferential grooves 3$i$ are disposed in the crown region Ycr to divide the crown region Ycr into an inner crown region Ycr1 located between the inner circumferential grooves 3$i$, 3$i$ and outer crown regions Ycr2 located between each of the inner circumferential grooves 3$i$ and each of the outermost circumferential grooves 3$o$.

The lateral grooves 4 comprise a plurality of center lateral grooves 4$c$ disposed in the inner crown region Ycr1 to form a row of center blocks 5$c$ arranged in the circumferential direction of tire, a plurality of middle lateral grooves 4$m$ disposed in each of the outer crown regions Ycr2 to form a row of middle blocks 5$m$ arranged in the circumferential direction of tire, and a plurality of outer lateral grooves 4$o$ disposed in the shoulder region Ysh to form a row of outer blocks 5$o$ arranged in the circumferential direction of tire.

The circumferential main grooves 3 are wide grooves having a width Wg of at least 3 mm, and may extend circumferentially in a straight line form, a zigzag form, a wave-like form or the like. Straight grooves that edges formed by groove walls and the tread surface extend straight in the circumferential direction are preferred from the viewpoint of wear resistance. It is more preferable from the viewpoints of water-expelling performance and shearing force of snow columns that the circumferential main grooves 3 are straight grooves having a constant cross sectional shape and extending in the circumferential direction.

Groove depth Dg (not shown) of the circumferential main grooves 3 is not particularly limited, but when the pneumatic tire of the present invention is produced as a studless tire for passenger cars, the groove depth Dg is generally from 8.0 to 10.0 mm.

A width and a depth of lateral grooves used in conventional studless tires are applicable to width Wy and depth Dy (not shown) of the lateral grooves 4 in the present invention. In general, the width Wy and depth Dy of the lateral grooves 4 are identical to or smaller than the width Wg and depth Dg of the circumferential grooves 3.

A sipe or sipes 6 are formed in the surface of each of the blocks 5. Each of the sipes 6 has at least a zigzag part 8 extending in a zigzag form in the length direction of the sipe, and may be composed of only the zigzag part 8 or may further include a linear part or parts extending from one or both ends of the zigzag part 8 along the sipe length direction. The linear part may be slightly curved. A width and a depth of sipes used in conventional studless tires are applicable to the present invention. In this embodiment, the sipes 6 have a width of about 0.5 mm and a maximum depth of about 4.0 mm.

Figure 3:
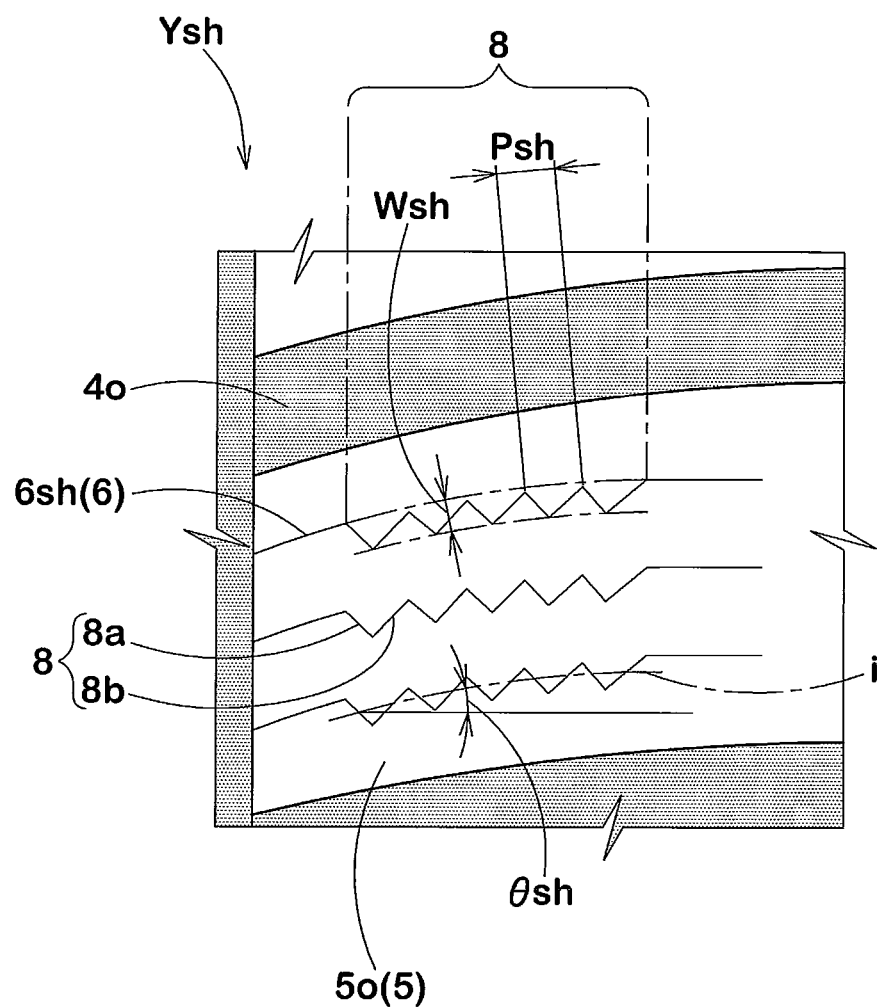
FIG. 3 is a plan view showing a block disposed in the shoulder region.
Figure 4:
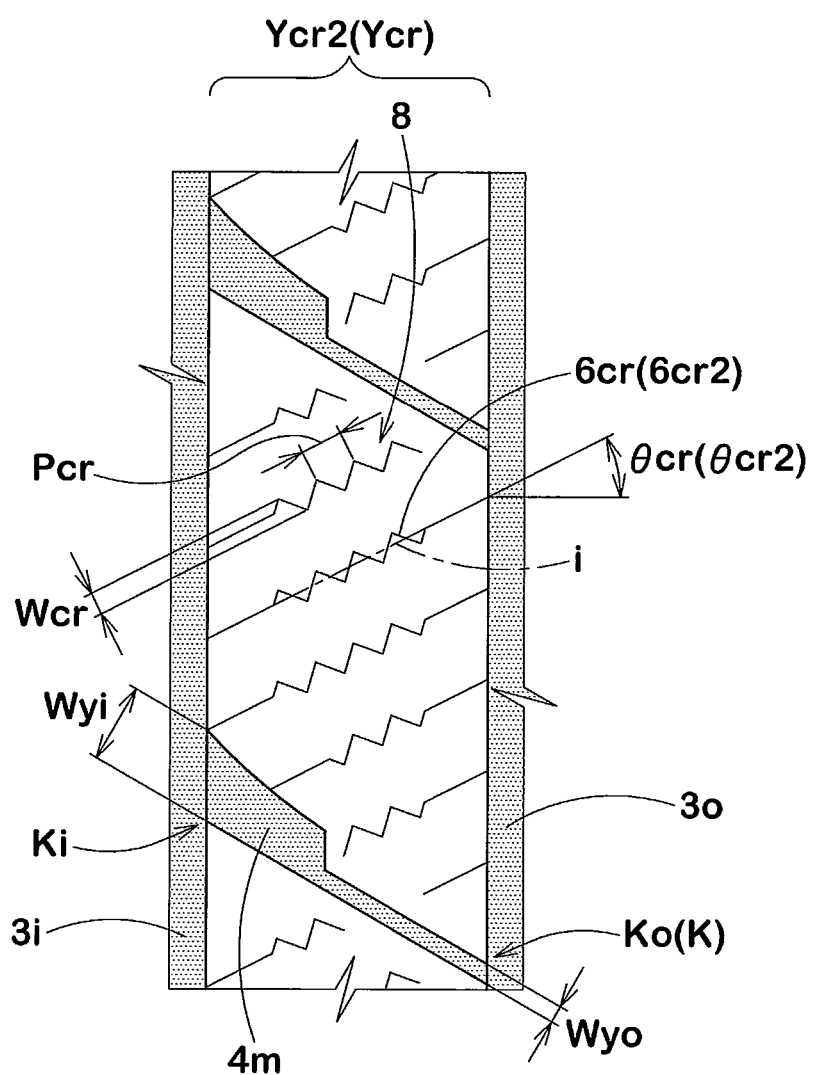
FIG. 4 is a plan view showing a block disposed in the outer crown region.
Figure 5:
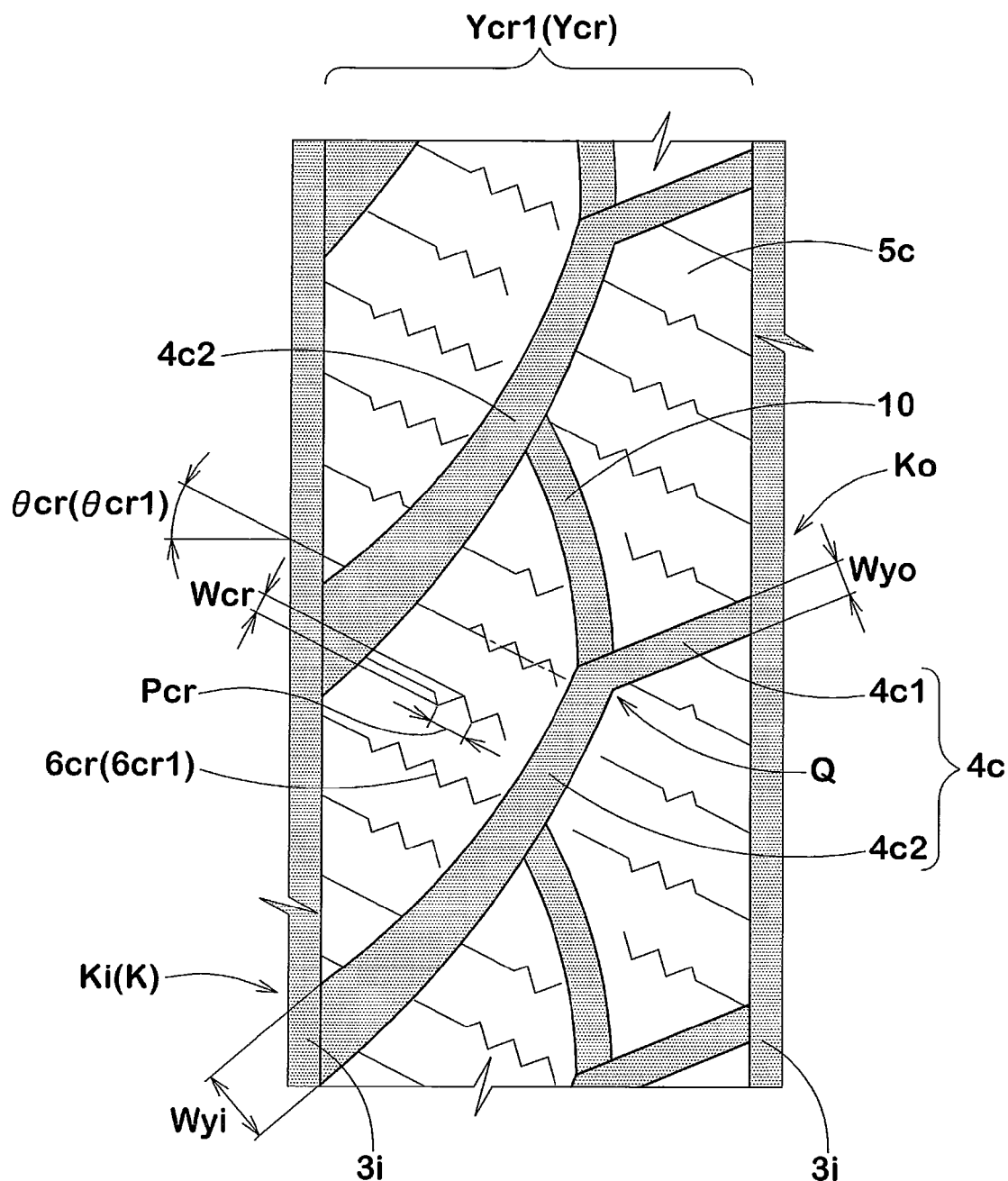
FIG. 5 is a plan view showing a block disposed in the inner crown region.

In the pneumatic tire 1 of the present invention, the sipes 6 comprises sipes 6sh disposed in the shoulder regions Ysh, and sipes 6cr disposed in the crown region Ycr which are different from the sipes 6sh. Specifically, as shown in FIGS. 3 to 5 which show an outer block 5o, a middle block 5m and a center block 5c, respectively, the sipes 6sh are formed in the outer blocks 5o, and the sipes 6cr are formed in the middle blocks 5m and the center blocks 5c. In the present invention, the sipes 6sh and 6cr are formed so that the zigzag part 8 of each of the sipes 6sh disposed in the shoulder regions Ysh has a larger amplitude Wsh and a larger pitch Psh than amplitude Wcr and pitch Pcr of the zigzag part 8 of each of the sipes 6cr disposed in the crown region Ycr, i.e., Wsh>Wcr and Psh>Pcr.

A sipe having a small zigzag amplitude and a small zigzag pitch (which may be hereinafter referred to as "small zigzag sipe") serves to ease the block rigidity, since engagement of opposite zigzag walls of the sipe is shallow and a binding force between the sipe walls is weak. As a result, blocks are deformable, when the tread surface comes into contact with the ground, to enhance the snow-biting performance and the snow-expelling performance. In the present invention, the on-snow performances are effectively improved by disposing the small zigzag sipes 6cr in the crown region Ycr having a large influence on snow road traveling. On the other hand, a sipe having a large amplitude and a large pitch of a zigzag (which may be hereinafter referred to as "large zigzag sipe") serves to enhance the block rigidity, since engagement of opposite zigzag walls of the sipe is deep or firm and a binding force between the sipe walls is large. Therefore, a high resistance to a lateral force acting during cornering or lane change can be exhibited by disposing the large zigzag sipes 6sh in the shoulder regions Ysh having a large influence on the steering stability on dry roads. Thus, in cooperation with formation of the small zigzag sipes 6cr in the crown region Ycr, the dry steering stability can be improved with improving the on-snow performances.

If a ratio Wsh/Wcr of the zigzag amplitude Wsh of the sipes 6sh to the zigzag amplitude Wcr of the sipes 6cr is less than 1.20, and if a ratio Psh/Pcr of the zigzag pitch Psh of the sipes 6sh to the zigzag pitch Pcr of the sipes Pcr is less than 1.20, a difference in size of zigzag is too small, so the above-mentioned effects cannot be sufficiently exhibited. On the other hand, if the ratio Wsh/Wcr is more than 2.0, and if the ratio Psh/Pcr is more than 3.0, adverse effect of the small zigzag sipes 6cr disposed in the crown region Ycr on the dry steering stability and adverse effect of the large zigzag sipes 6sh disposed in the shoulder regions Ysh on the on-snow performances increase, so the above-mentioned effects of the invention cannot be sufficiently exhibited. Therefore, it is preferable that the ratio Wsh/Wcr is at least 1.20, especially at least 1.40, and is at most 2.0, especially at most 1.8. Further, it is preferable that the ratio Psh/Pcr is at least 1.20, especially at least 1.40, and is at most 3.0, especially at most 2.5.

As shown in FIGS. 3 to 5, the sipes 6 are disposed so that an inclination angle θsh of the sipes 6sh disposed in the shoulder regions Ysh with respect to the axial direction of tire is smaller than an inclination angle θcr of the sipes 6cr disposed in the crown region Ycr with respect to the axial direction. The reason is that for exhibiting a high resistance to a lateral force acting at cornering or lane change to thereby improve the dry steering stability, it is important to enhance a block rigidity in the tire axial direction of the shoulder regions Ysh. On the other hand, since the inclination angle θcr of the sipes 6cr disposed in the crown region Ycr is relatively made larger, edge components in the axial and circumferential directions of tire can be increased to enhance the grip performance on not only a snow-covered road but also a road with a low friction resistance μ, particularly a icy road.

It is preferable in achieving these effects that the inclination angle θsh of the sipes 6sh is 30° or less. It is also preferable that the inclination angle θcr of the sipes 6cr is from 15 to 60°. If the inclination angle θsh is more than 30°, the dry steering stability tends to lower. If the inclination angle θcr is outside the above range, it will be difficult to enhance the grip performance on a low μ road. From such points of view, it is more preferable that the inclination angle θsh is at most 20°, and the inclination angle θcr is at least 20° and at most 40°.

The terms "inclination angles θsh and θcr" of the sipes 6 with respect to the axial direction" means an angle of an amplitude center line "i" of a zigzag shape of the zigzag part 8 with respect to the axial direction of tire. In case that the zigzag center line "i" is a curve, the inclination angles θsh and θcr are determined by an angle of a tangent to the curve "i" with respect to the axial direction.

In a preferable embodiment as shown in the drawings, the sipes 6cr to be disposed in the crown region Ycr are formed so that the inclination direction of sipes 6cr1 disposed in the inner crown region Ycr1 (shown in FIG. 5) is opposite to that of sipes 6cr2 disposed in the outer crown regions Ycr2 (shown in FIG. 4) with respect to the axial direction of the tire. Specifically, the sipes 6cr1 are inclined to fall from top left to bottom right, and the sipes 6cr2 are inclined to rise from bottom left to top right. From the viewpoint of preventing occurrence of drifting, it is preferable that a difference "θcr1−θcr2" between inclination angle θcr1 of the sipes 6cr1 and inclination angle θcr2 of the sipes 6cr2 is 15° or less. In FIGS. 4 and 5, the inclination angle θcr1 is approximately the same as the inclination angle θcr2.

Figure 6:
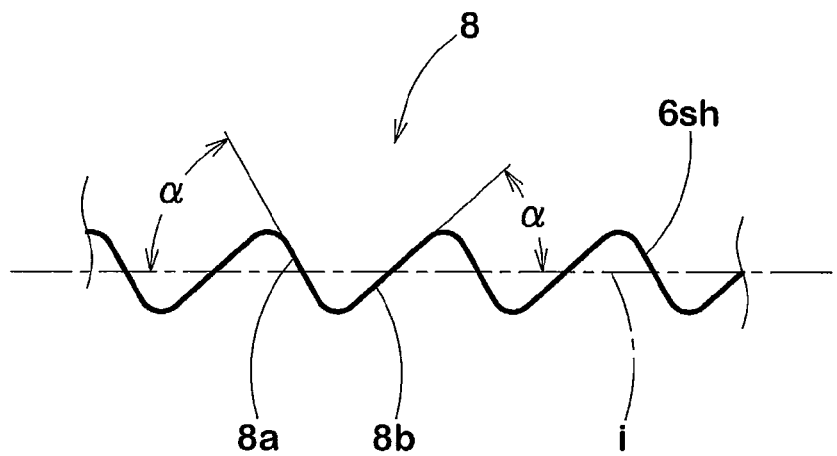
FIG. 6 is an enlarged view showing a sipe disposed the shoulder region.
Figure 7:
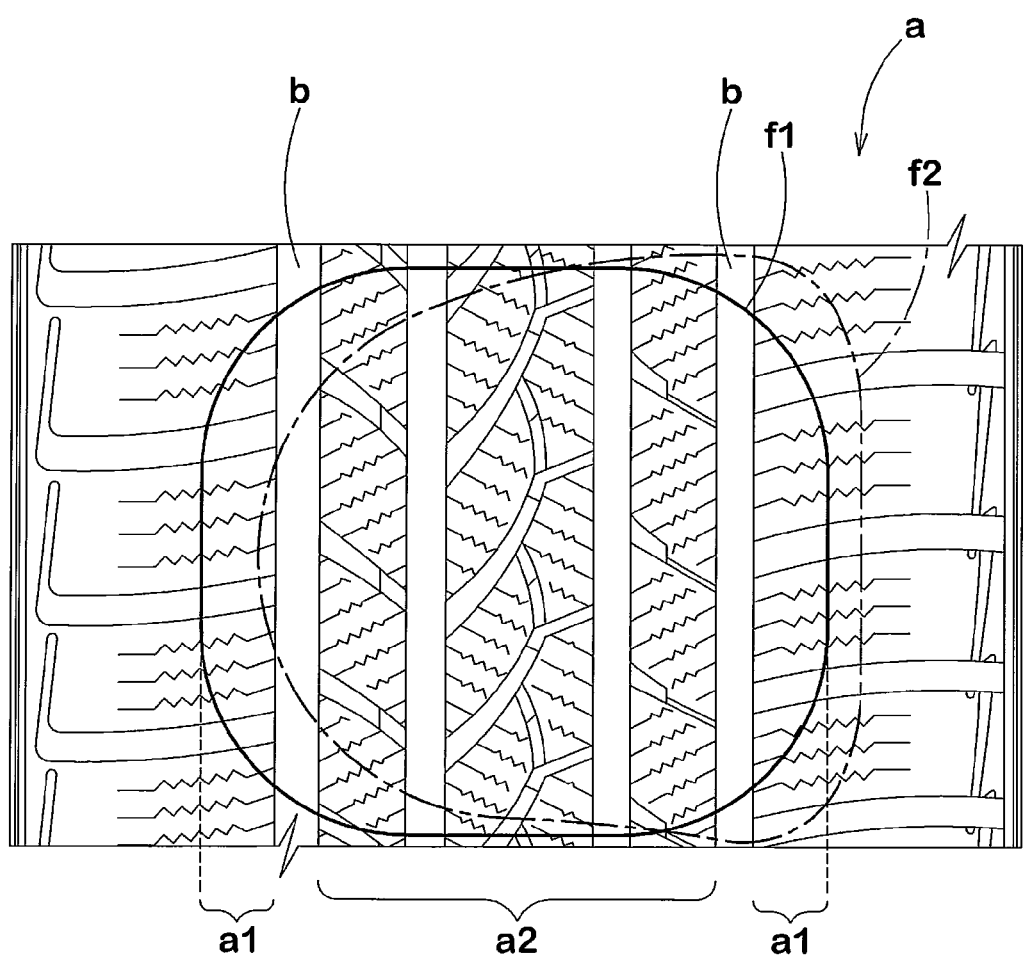
FIG. 7 is a view conceptually showing a ground contact area in traveling on a snow-covered road and a ground contact area in cornering on a dry road.

Further, it is preferable that the sipes 6sh disposed in the shoulder region Ysh are formed so that the inclination direction of the zigzag center line "i" of the zigzag part 8 thereof with respect to the axial direction is the same as the inclination direction with respect to the axial direction of the outer lateral grooves 4o disposed in the shoulder region Ysh. In the embodiment shown in FIG. 3, the zigzag center line "i" of the sipes 6sh and the outer lateral grooves 4o both are inclined to rise from bottom left to top right. In particular, an instance is shown wherein the zigzag center line "i" of the sipes 6sh and the outer lateral grooves 4o are disposed in an approximately parallel relationship to each other, whereby lowering of the block rigidity can be minimized. It is also preferable that as shown in FIG. 6 in an enlarged form, the zigzag part 8 of the sipe 6sh is formed into such a sawtooth form that first zigzag sides 8a which intersect with the zigzag center line "i" at a larger angle α and second zigzag sides 8b which intersect with the zigzag center line "i" at a smaller angle α alternately continue, wherein the inclination direction of the first zigzag sides 8a with respect to the axial direction is opposite to the inclination direction of the zigzag center line "i" with respect to the axial direction, and the inclination direction of the second zigzag sides 8b with respect to the axial direction is the same as the inclination direction of the zigzag center line "i" with respect to the axial direction. In the embodiment shown in FIG. 3, the zigzag center line "i" and the second zigzag sides 8b tilt upward from left to right, and the first zigzag sides 8a tilt downward from left to right. When the zigzag part 8 of the sipes 6sh is formed into such a shape, balancing between an axial edge component of the first zigzag sides 8a and an axial edge component of the second zigzag sides 8b and balancing between a circumferential edge component of the first zigzag sides 8a and a circumferential edge component of the second zigzag sides 8b can be achieved with inclining the zigzag center line "i" with respect to the axial direction, particularly arranging the zigzag center line "i" and the outer lateral grooves 4o parallel to each other, whereby the edge effects can be balanced to enhance a straight running performance while maintaining the block rigidity in the shoulder regions Ysh at a high level.

On the other hand, the sipes 6cr1 and 6cr2 disposed in the inner and outer crown regions Ycr1 and Ycr2 are formed so that the center line "i" of the zigzag part 8 thereof tilt in the opposite direction with respect to the axial direction to inclination of the lateral grooves 4c and 4m disposed in the inner and outer crown regions Ycr1 and Ycr2. In the embodiment shown in the drawings, the zigzag center line "i" of the sipes 6cr1 in the inner crown region Ycr1 tilts downward from left to right, and the lateral grooves 4c in the inner crown region Ycr1 tilt upward from left to right. Further, in the outer crown regions Ycr2, the zigzag center line "i" of the sipes 6cr2 tilts upward from left to right, and the lateral grooves 4m tilt downward from left to right. In particular, it is preferable that the zigzag center line "i" of the sipes 6cr1 intersects with the lateral grooves 4c at an angle of at least 30°, and the zigzag center line "i" of the sipes 6cr2 intersects with the lateral grooves 4m at an angle of at least 30°. Such an arrangement of the sipes 6cr1 and 6cr2 is advantageous for the on-snow performances, since the block rigidity of the crown region Ycr can be eased in a good balance.

As shown in FIG. 5, the inner lateral grooves 4c used in this embodiment are approximately V-shaped bent grooves having such a shape that a gently-inclined first part 4c1 and a steeply-inclined second part 4c2 are joined at a bending point Q, and adjacent inner lateral grooves 4c, 4c are connected with each other through connecting grooves 10 each extending from the bending point Q, especially a point Q side end of the first part 4c1, up to the send part 4c2 of an adjacent inner lateral groove 4c, thereby further enhancing the water-expelling performance and the on-snow performances. The first and second parts 4c1 and 4c2 of the inner lateral groove 4c and the connecting groove 10 may be a straight groove or a slightly curved groove. In the embodiment shown in the drawings, the connecting groove 10 and the second part 4c2 of the inner lateral groove 4c are smoothly continuous with each other to form a single arc-like groove, thereby enhancing the water-expelling performance on the tire equator C at which a high water-expelling performance is required.

The pneumatic tire of the present invention preferably has an asymmetric tread pattern wherein patterns on both sides of the tire equator C are different, as shown in FIG. 2. The pneumatic tire of the embodiment shown in the drawings has an asymmetric tread pattern wherein an outer half 2o of the tread portion 2 which lies on a vehicle outer side with respect to the tire equator C when the tire is fitted to a vehicle has a land proportion Lo larger than a land proportion Li of an inner half 2i of the tread portion 2 which lies on a vehicle inner side with respect to the tire equator when the tire is fitted to the vehicle. Since the land proportion Lo of the outer half 2o on which a large load acts during cornering is increased to enhance the pattern rigidity, the dry steering stability can be further improved while securing an excellent on-snow performances mentioned above. It is preferable that the land proportion Lo of the outer half 2o is from 63.5 to 69.5%, and the land proportion Li of the inner half 2i is from 59.5 to 65.5%. Further, from the viewpoints of on-snow performances, dry steering performance and uneven wear resistance, it is preferable that a difference "Lo−Li" between the land proportions Lo and Li is from 2.0 to 5.0%. As well known, the term "land proportion" as used herein means a proportion of the surface area of a land portion (total surface areas of blocks) based on the whole surface area of the tread portion 2 between the both tread ground contact edges Te, Te (including the area of whole grooves), namely the whole surface area of the tread portion 2 in the state that all grooves are filled.

In the present embodiment, each of the lateral grooves 4m and 4c disposed in the crown region Ycr has, at its axially both ends, intersecting parts K at which the lateral groove intersects with the circumferential grooves 3, as shown in FIGS. 4 and 5. Groove width Wyo of each of the lateral grooves 4m and 4c at outer intersecting parts Ko which are located on a vehicle outer side when the tire is fitted to a vehicle is made smaller than groove width Wyi of the lateral grooves 4m and 4c at inner intersecting parts Ki which are located on a vehicle inner side when the tire is fitted to a vehicle. Since the groove widths Wyo and Wyi of the lateral grooves 4m and 4c at their both axial ends are set to Wyo<Wyi, the pattern rigidity can be increased toward the outer side of a vehicle, whereby the dry steering stability can be further improved in cooperation with the land proportion relationship of Li<Lo. It is preferable that the groove width Wy of each of the lateral grooves 4m and 4c is increased smoothly and/or stepwise from the outer intersecting part Ko toward the inner intersecting part Ki.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

Examples

Studless tires for passenger cars having a size of 205/55R16 and a basic tread pattern shown in FIG. 1 were manufactured based on the specifications shown in Table 1, and were tested with respect to dry steering stability and on-snow performance. Specifications of tires other than amplitude and pitch of a zigzag part of respective sipes are substantially common to all tires. The results are shown in Table 1.

Testing methods are as follows:
(1) Dry Steering Stability

The tires were attached to all wheels of a vehicle, and the vehicle was run on a test course of a dry asphalt road. The steering stability (stability during lane change and cornering) was evaluated by driver's feeling. The results are shown by an index based on the result of Comparative Example 1 regarded as 100. The larger the value, the better the steering stability on a dry road.

Rim size: 16×6.5 J
Inner pressure: 200 kPa
Vehicle: 2,000 cc FR passenger car
(2) On-Snow Performance The above-mentioned test car was run on a snow-covered road. The steering stability was evaluated by driver's feeling. The results are shown by an index based on the result of Comparative Example 1 regarded as 100. The larger the value, the better the on-snow performance.

TABLE 1

|  | Com. Ex. 1 | Com. Ex. 2 | Com. Ex. 3 | Ex. 1 | Ex. 2 | Ex. 3 | Ex. 4 | Ex. 5 |
|---|---|---|---|---|---|---|---|---|
| Sipe in crown region | | | | | | | | |
| Amplitude Wcr of zigzag (mm) | 1.4 | 1.8 | 1.8 | 1.4 | 1.4 | 1.4 | 1.4 | 1.4 |
| Pitch Pcr of zigzag (mm) | 3.0 | 4.0 | 4.0 | 3.0 | 3.0 | 3.0 | 3.0 | 3.0 |
| Sipe in shoulder regions | | | | | | | | |
| Amplitude Wsh of zigzag (mm) | 1.4 | 1.8 | 1.4 | 1.8 | 2.1 | 2.8 | 1.7 | 2.8 |
| Pitch Psh of zigzag (mm) | 3.0 | 4.0 | 3.0 | 4.0 | 4.5 | 6.0 | 3.6 | 9.0 |
| Ratio Wsh/Wcr | 1.0 | 1.0 | 0.78 | 1.3 | 1.5 | 2.0 | 1.2 | 2.0 |
| Ratio Psh/Pcr | 1.0 | 1.0 | 0.75 | 1.3 | 1.5 | 2.0 | 1.2 | 3.0 |
| Dry steering stability | | | | | | | | |
| Lane change | 100 | 110 | 100 | 110 | 115 | 115 | 108 | 118 |
| Cornering | 100 | 110 | 100 | 110 | 115 | 115 | 108 | 118 |
| On-snow performance | | | | | | | | |
| Lane change | 100 | 100 | 100 | 105 | 98 | 95 | 105 | 95 |
| Cornering | 100 | 100 | 100 | 105 | 98 | 95 | 105 | 95 |

What is claimed is:

1. A pneumatic tire comprising a tread portion having a plurality of circumferential main grooves extending continuously in a circumferential direction of the tire, a plurality of lateral grooves extending in a direction intersecting said circumferential main grooves to divide said tread portion into a plurality of blocks, and sipes having a zigzag part and provided in said blocks, and
    a pair of shoulder portions each including a tread ground contact edge of the tread portion and having a round shoulder shape such that a profile line in the meridian section of the tire comprises a circular arc curve having a radius of curvature of at least 25 mm,
    said plurality of circumferential main grooves including a pair of axially outermost circumferential grooves dividing said tread portion into shoulder regions located axially outward of said outermost circumferential grooves and a crown region located between said outermost circumferential grooves, wherein
    said zigzag part of each of said sipes disposed in said shoulder regions has an amplitude Wsh and a pitch Psh and said zigzag part of each of said sipes disposed in said crown region has an amplitude Wcr and a pitch Pcr which are smaller than said amplitude Wsh and said pitch Psh, respectively,
    said sipes disposed in said shoulder regions are inclined at an angle θsh with respect to an axial direction of the tire and said sipes disposed in said crown region are inclined at an angle θcr with respect to the axial direction which is larger than said angle θsh, and
    in each said shoulder region, the lateral grooves disposed therein are inclined to one direction with respect to the axial direction and a zigzag center line of the zigzag part of each said sipe disposed therein is inclined with respect to the axial direction to the same direction as the inclination direction of the lateral grooves, wherein
        the zigzag part has a sawtooth form formed by alternately arranged first zigzag sides and second zigzag sides,
        the first zigzag sides intersect with said zigzag center line at a larger angle α and are inclined with respect to the axial direction to a direction opposite to the inclination direction of said zigzag center line with respect to the axial direction, and
        the second zigzag sides intersect with said zigzag center line at a smaller angle α than that of the first zigzag sides and are inclined with respect to the axial direction to the same inclination direction as said zigzag center line with respect to the axial direction.

2. The pneumatic tire of claim 1, wherein
a ratio Wsh/Wcr of said amplitude Wsh to said amplitude Wcr is region is from 1.2 to 2.0, and
a ratio Psh/Pcr of said pitch Psh to said pitch Pcr is from 1.2 to 3.0.

3. The pneumatic tire of claim 1, wherein said angle θsh is 30° or less, and said angle θcr is from 15 to 60°.

4. The pneumatic tire of claim 1, wherein
said circumferential main grooves further include two inner circumferential grooves disposed in said crown region to divide said crown region into an inner crown region located between said inner circumferential grooves and outer crown regions located between each of said inner circumferential grooves and each of said outermost circumferential grooves,
all of the sipes disposed in said inner crown region are inclined with respect to the axial direction of the tire to one direction, and
all of the sipes disposed in said outer crown regions are inclined with respect to the axial direction of the tire to one direction which is opposite to that of the sipes disposed in said inner crown region.

5. The pneumatic tire of claim 4, wherein
each of the lateral grooves disposed in the inner crown region is a bent groove having a bent point and connected to the next lateral grooves through connecting grooves each extending from the bent point.

6. The pneumatic tire of claim 5, wherein
all of the lateral grooves disposed in the inner crown region are inclined with respect to the axial direction of the tire to one direction which is opposite to that of the sipes disposed in the inner crown region.

7. The pneumatic tire of claim 6, wherein
all of the lateral grooves disposed in the outer crown regions are inclined with respect to the axial direction of the tire to one direction which is opposite to that of the sipes disposed in the outer crown regions.

8. The pneumatic tire of claim 5, wherein
all of the lateral grooves disposed in the outer crown regions are inclined with respect to the axial direction of the tire to one direction which is opposite to that of the sipes disposed in the outer crown regions.

9. The pneumatic tire of claim 1, wherein an outer half of said tread portion which lies on a vehicle outer side with respect to a tire equator when the tire is fitted to a vehicle has a land proportion Lo larger than a land proportion Li of an inner half of said tread portion which lies on a vehicle inner side with respect to the tire equator when the tire is fitted to the vehicle.

10. The pneumatic tire of claim 1, wherein each of the lateral grooves disposed in said crown region has a first axial end and a second axial end each open to one of the circumferential grooves and located on an outer side and an inner side of a vehicle, respectively, when the tire is fitted to the vehicle, so that the width of the lateral groove is smaller at the first axial end to be located on the outer side than at the second axial end to be located on the inner side.

* * * * *